Jan. 10, 1939.    H. J. SAUER    2,143,281
REAR VISION MIRROR BRACKET
Filed Aug. 19, 1937
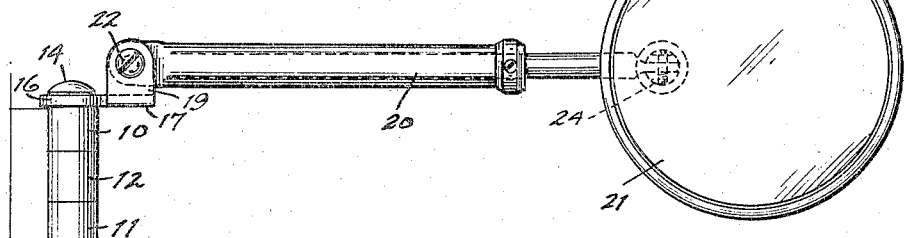
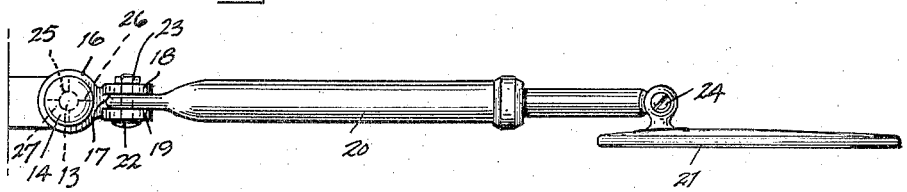
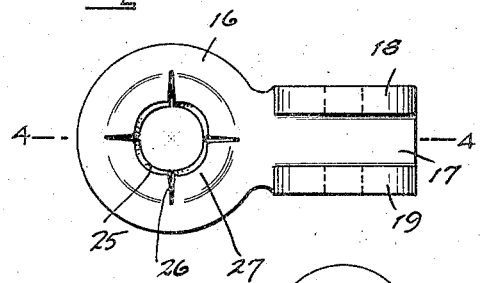
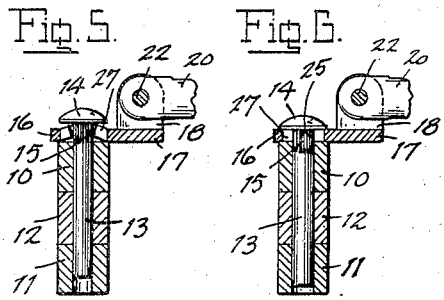
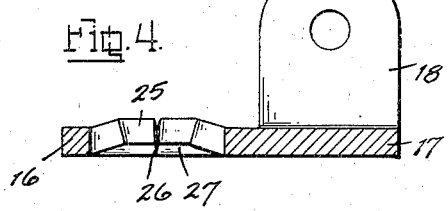
INVENTOR
HENRY J. SAUER.
BY
ATTORNEY Patented Jan. 10, 1939

2,143,281

UNITED STATES PATENT OFFICE 2,143,281

REAR VISION MIRROR BRACKET

Henry J. Sauer, Fairfield, Conn., assignor to The Kilborn-Sauer Company, Fairfield, Conn., a corporation of Connecticut Application August 19, 1937, Serial No. 159,991

1 Claim. (Cl. 248—205)

The present invention relates to a rear vision mirror bracket, particularly of the type adapted for use in connection with automobile door hinges, and has for an object to provide a bracket which may be conveniently secured to the hinge by means of the hinge pin forming a part of the hinge, and which when connected to the hinge will provide a rigid and reliable support for the mirror, so that the same will not become loose or displaced through shocks and vibrations imposed thereon during normal use of the automobile.

With the above and other objects in view, an embodiment of the invention is shown in the accompanying drawing, and this embodiment will be hereinafter more fully described with reference thereto, and the invention will be finally pointed out in the claim.

In the drawing:

Fig. 1 is an elevation showing the rear vision mirror and bracket, according to my invention, mounted upon the automobile door hinge.

Fig. 2 is a plan view.

Fig. 3 is an enlarged plan view of the bracket before attachment to the hinge, the mirror supporting arm being removed.

Fig. 4 is a sectional view taken along the line 4—4 of Fig. 3.

Fig. 5 is a vertical sectional view showing the bracket assembled with the hinge, and before the hinge pin is fully driven into its normal operative position.

Fig. 6 is a similar view showing the bracket and hinge pin in their normal operative position.

Similar reference characters indicate corresponding parts throughout the several figures of the drawing.

Referring to the drawing the automobile hinge comprises two stationary end hinge knuckles 10 and 11 secured to the door frame, an intermediate rotatable hinge knuckle 12 secured to the door, and a hinge pin 13 having a head 14 at its upper end and driven into the knuckles 10, 11 and 12, the hinge pin being provided adjacent the head with a fluted or knurled portion 15, which when the pin is driven into the hinge bites into the bore of the knuckle 10 to insure a tight driving fit of the pin. This pin it will be understood, can be driven out of the hinge by inserting a suitable driving tool in the lower end and hammering upwardly, and for the purpose of the present invention it is removed and replaced to secure the bracket in place.

The bracket comprises a circular base portion 16 having a lateral projection 17 provided with upwardly bent apertured ears 18 and 19, between which the end of the arm 20 which supports the mirror 21 is secured for relative adjustment by means of a bolt 22 and nut 23. The arm is shown as of the telescoping type, so that the mirror may be adjustably extended, as desired, and is connected to the mirror by a pivot joint 24, by means of which the angle of the mirror may be adjusted with respect to the arm.

The base 16 is provided with an aperture 25 having a plurality of radially extending slits 26, the segmental portions 27 between these slits being bent upwardly in angular relation before attachment of the hinge, so that the aperture 25 is somewhat enlarged in size from its size with relation to the flat base before bending of the segments. This enlarged size is calculated as being slightly larger than the diameter of the pin 13, so that it can be loosely fitted thereon, and can be sufficiently large to provide for several sizes of such pins, it being understood that in different makes of cars there is a slight variation in the diameters of the pins. The upward bending of the segments furthermore produces a series of knife edge portions which form the points of a scalloped shaped formation, which the aperture 25 assumes when the segments 27 are bent upwardly.

As shown in Fig. 5 the bracket is placed upon the supporting end of the hinge knuckles 10, and the pin 13 which has previously been removed is driven into place. As it is finally driven by hammer blows to the normal position shown in Fig. 6, the head 14 causes the segmental portions 27 of the base to be deformed to their flat position, or to a position approximating this, this action causing the wall of the aperture and the knife edges formed by the slits to tightly bind and bite into the upper knurled portion 15 of the pin, thus rigidly securing the bracket in place against any possibility of accidentally becoming loose or displaced.

I have illustrated and described a preferred and satisfactory embodiment of the invention, but it will be understood that changes may be made therein, within the spirit and scope thereof, as defined in the appended claim.

Having thus described my invention what I claim and desire to secure by Letters Patent is:—

A bracket of the character described for attachment to a hinge including tubular knuckles and a removable pin having a head, comprising a deformable member having an aperture of such diameter as to bind upon said pin in the flattened state of said member and having radial slits extending outwardly from said aperture to points between said aperture and the outer periphery of said member, the segmental portions between said slits and the sectional edge portions of said aperture being bent out of the plane of said member and said sectional edge portions being separated through spreading of said slits whereby said aperture is enlarged to receive freely said pin, said apertured member adapted to be engaged upon said pin between its head and the upper end of said knuckles and subjected to flattening pressure by said head whereby said aperture contracts and binds about said pin.

HENRY J. SAUER.